(12) United States Patent
Wu et al.

(10) Patent No.: US 8,760,490 B2
(45) Date of Patent: Jun. 24, 2014

(54) TECHNIQUES FOR A RATE-ADAPTIVE VIDEO CONFERENCE BRIDGE

(75) Inventors: Duanpei Wu, San Jose, CA (US); Jing Li, Palo Alto, CA (US); Shih-cheng Stan Yang, Saratoga, CA (US); Herbert M. Wildfeuer, Santa Barbara, CA (US); Anand Oswal, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 232 days.

(21) Appl. No.: 13/307,521

(22) Filed: Nov. 30, 2011

(65) Prior Publication Data
US 2013/0135427 A1  May 30, 2013

(51) Int. Cl.
*H04N 7/15* (2006.01)
(52) U.S. Cl.
USPC .................... 348/14.09; 348/14.12
(58) Field of Classification Search
USPC ................ 348/14.09, 14.08, 14.12, 14.01
See application file for complete search history.

(56) References Cited

U.S. PATENT DOCUMENTS

| 7,321,384 | B1 | 1/2008 | Wu et al. | |
| 7,940,294 | B2 | 5/2011 | Wu et al. | |
| 2009/0295905 | A1* | 12/2009 | Civanlar et al. | 348/14.09 |
| 2010/0149308 | A1* | 6/2010 | Mihara | 348/14.09 |

* cited by examiner

*Primary Examiner* — Stella Woo
(74) *Attorney, Agent, or Firm* — Edell, Shapiro & Finnan, LLC

(57) ABSTRACT

A rate adaptive video conference bridge and related techniques are provided. At a video conference bridge, a source video stream is received from a source endpoint device in a network. The source video stream is encoded using a first encoder unit and second encoder unit to generate respective first and second encoded video streams. A determination is made whether to decrease or increase a bit rate of the source video stream based on network condition information. If the bit rate is to be decreased, the first encoder unit is instructed to send the first encoded video stream to a destination endpoint device. If the bit rate is to be increased, the second encoder unit is instructed to send the second encoded video stream to the destination endpoint device.

26 Claims, 6 Drawing Sheets

TECHNIQUES FOR A RATE-ADAPTIVE VIDEO CONFERENCE BRIDGE

TECHNICAL FIELD

The present disclosure relates to video conference management and video stream frame bit rate adjustment.

BACKGROUND

In voice-activated video conferencing systems video bridge devices support multiple video compression standards (such as H.263 and H.264). Typically, all the participants receive the video stream from the current loudest speaker in a conference session, and the current loudest speaker receives the video stream from the previous loudest speaker. In homogenous video conferences, all participants receive video streams having the same format. In heterogeneous video conferences, participants often receive video streams having formats different from other participants. The different formats may cause disruption in the video streams sent to the participants.

DESCRIPTION OF EXAMPLE EMBODIMENTS

Overview

Techniques are provided to adjust or adapt a bit rate of video streams supplied to endpoint devices by a video conference bridge. At the video conference bridge, a source video stream is received from a source endpoint device in a network. The source video stream is decoded and then re-encoded using a first encoder unit and a second encoder unit to generate respective first and second encoded video streams. A determination is made whether to decrease or increase a bit rate of the source video stream based on network condition information. If the bit rate is to be decreased, the first encoder unit (which, for example, may generate a relatively low bit rate video stream) is instructed to send the first encoded video stream to a destination endpoint device. If the bit rate is to be increased, the second encoder unit (which, for example, may generate a relatively high bit rate video stream) is instructed to send the second encoded video stream to the destination endpoint device.

Example Embodiments

Figure 1:
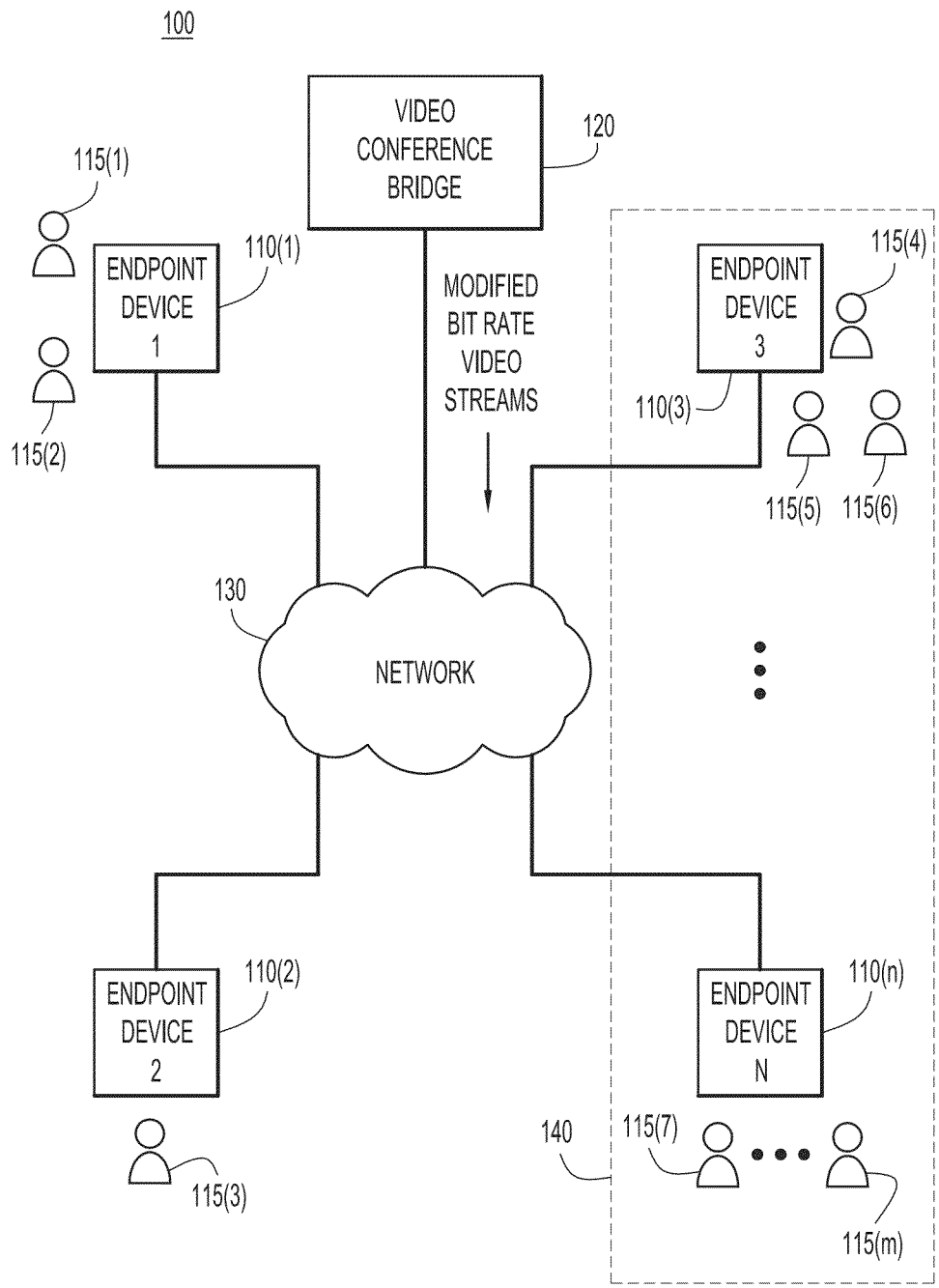
FIG. 1 shows an example audio/video network environment including a plurality of audio/video endpoint devices and an audio/video conference bridge apparatus that is configured to manage the bit rate of video streams.

FIG. 1 shows an example audio/video network environment 100 including a plurality of audio/video endpoint devices and an audio/video conference bridge apparatus. The audio/video endpoint devices (herein "endpoint devices") are shown at reference numerals 110(1)-110(n), and the audio/video conference bridge apparatus (herein "video conference bridge") is shown at reference numeral 120. The endpoint devices 110(1)-110(n) communicate with the video conference bridge 120 via a network 130 in order to send and receive audio and video (i.e., video streams) within the audio/video network environment 100.

Each of the endpoint devices 110(1)-110(n) may service a plurality of participants. The participants are shown in FIG. 1 at reference numerals 115(1)-115(m) at various ones of the endpoint devices 110(1)-110(n). The participants 115(1)-115(m) may be human or automated participants of an audio/video conference, and during the course of the conference session, the participants 115(1)-115(m) communicate with one another via their respective endpoint devices 110(1)-110(n). It should be appreciated that the audio/video network environment 100 may contain any number of endpoint devices and that any number of participants may be located at each of the endpoint devices 110(1)-110(n).

In general, the endpoint devices 110(1)-110(n) may be any device that is configured to capture, send and receive audio and video data (herein "video streams"), for example, of the participants 115(1)-115(m) and of other material presented during the conference, such as documents, images, videos, etc. The endpoint devices 110(1)-110(n) are also configured to display the video streams to the participants 115(1)-115(m). For example, the endpoint devices 110(1)-110(n) may be any audio/video teleconference video device, web camera or video enabled laptop device, mobile device, tablet, computer, etc. Likewise, the video conference bridge 120 may be any device that is configured to send and receive the video streams to and from one or more of the endpoint devices 110(1)-110(n). Additionally, the video conference bridge 120 may be any device that is configured to decode video streams received from a source endpoint device (e.g., endpoint device 110(1)) and encode them into a varying bit rates to be sent to the destination endpoint devices (e.g., endpoint devices 110(2)-110(m)). In one example, as described herein, the video conference bridge 120 is configured to generate multiple encoded video streams at varying (different) bit rates, and determine whether to send encoded video streams at reduced bit rates based on network traffic information of the audio/video network environment 100.

The endpoint devices 110(1)-110(n) may send and receive the video streams to and from the video conference bridge 120 to enable the participants 115(1)-115(m) to communicate with one another via the endpoint devices 110(1)-110(n). In one example, the endpoint device 110(1) may be a "source" endpoint device that is configured to send a video stream of participants 115(1) and 115(2) to the video conference bridge 120, while endpoint devices 110(2)-110(n) may be "destination" endpoint devices that are configured to receive the video stream of participants 115(1) and 115(2), originating from the source endpoint 110(1), from the video conference bridge 120. It should be appreciated, however, that the destination endpoint devices 110(2)-110(n) may operate as source endpoint devices to send video streams of respective participants 115(3), 115(4)-115(6) and 115(7)-115(m) to the video conference bridge 120. Likewise, it should be appreciated that the source endpoint device 110(1) may operate as a destination endpoint device to receive these video streams from the video conference bridge 120. For simplicity, endpoint device 110(1) is described as the source endpoint device, and endpoint devices 110(2)-110(n) are described as the destination endpoint devices. The endpoint devices may optionally be grouped into clusters of one or more endpoint devices, as shown in reference numeral 140.

As described herein, when video streams are sent from the source endpoint device 110(1) to the video conference bridge 120 (for ultimate transmission to intended destination endpoint devices 110(2)-110(n)), portions of the video streams may be encoded by the source endpoint device 110(1). The video conference bridge 120 thus may need to decode the received video stream and then encode the decoded video stream into a format acceptable by the destination endpoint devices 110(2)-110(n). The video conference bridge 120 may encode the received video stream (e.g., after it has been decoded it from the format in which it was received) into multiple encoded video streams, each having a different bit rate. The video conference bridge 120 can then send one or more of the multiple encoded video streams (or a mixed combination of the encoded video streams) to the destination endpoint devices 110(2)-110(n) at an appropriate bit rate based on, for example, network conditions of the audio/video network 100.

Figure 2:
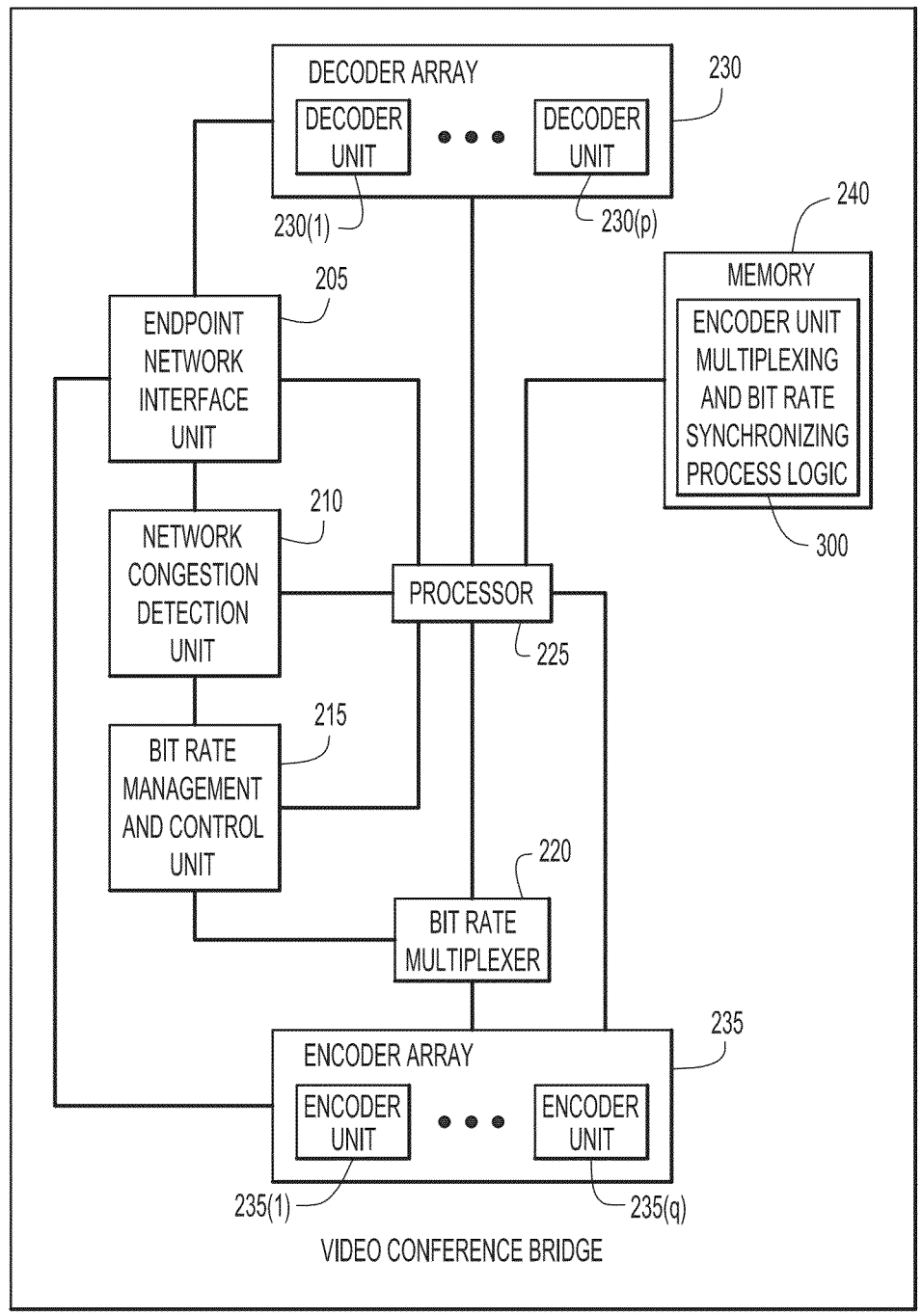
FIG. 2 is an example of a block diagram of the audio/video conference bridge apparatus configured to encode video streams received from the endpoint devices and to send the encoded videos streams to the endpoint devices at appropriate bit rates.

Reference is now made to FIG. 2. FIG. 2 shows an example block diagram of the video conference bridge 120. The video conference bridge 120 comprises an endpoint network interface unit 205, a network congestion detection unit 210, a bit rate management and control unit 215, a bit rate multiplexer 220, a processor 225, a decoder array 230, an encoder array 235 and a memory 240. The network interface unit 205, network congestion detection unit 210, bit rate management and control unit 215, bit rate multiplexer 220, encoder array 230 and decoder array 230 may be embodied as one or more application specific integrated circuits or their functions may be implemented in software executed by the processor 225 or by separate processors.

The endpoint network interface unit 205 is coupled to the network congestion detection unit 210, the processor 225, the decoder array 230 and the encoder array 235. The endpoint network interface unit 205 is configured to receive messages (e.g., video streams) originating from the source endpoint device 110(1) via the network 130. The endpoint network interface unit 205 is also configured to send messages (e.g., encoded video streams) to the destination endpoint devices 110(2)-110(n). In general, the endpoint network interface unit 205 is a network interface device, e.g., an Ethernet card, configured to send and receive messages over a network. To this end, the network interface unit may send and receive any data representing video streams to and from the endpoint devices 110(1)-110(n).

The network congestion detection unit 210 is coupled to the endpoint network interface unit 205, the bit rate management and control unit 215 and the processor 225. The network congestion detection unit 210 is configured to monitor the audio/video network 100 to gather network information related to network 100. For example, the network congestion detection unit 210 may monitor network bandwidth information to determine congestion in the audio/video network 100 (e.g., how many endpoint devices are in the audio/video network 100 and the different bit rates for video streams being transmitted in the audio/video network 100). Relatively low levels of available bandwidth in the audio/video network 100 may indicate relatively high levels of network congestion, while relatively high levels of available bandwidth in the audio/video network 100 may indicate relatively low levels of network congestion.

The bit rate management and control unit 215 is coupled to the network congestion detection unit 210, the processor 225 and the bit rate multiplexer 220. The bit rate management and control unit 215 is configured to determine whether or not to increase or decrease the bit rate of video streams to be transmitted to the destination endpoint devices based on, for example, the network congestion information determined by the network congestion detection unit 210. In one example, if the network congestion detection unit 210 determines that the audio/video network 100 is highly congested (e.g., the available bandwidth of the audio/video network 100 is below a predetermined threshold), the bit rate management and control unit 205 may instruct the processor to send video streams to the destination endpoint devices at lower bit rates than when the audio/video network 100 is not highly congested.

The bit rate multiplexer 220 is coupled to the bit rate management and control unit 215, the processor 225 and the encoder array 235. The bit rate multiplexer 220 is configured to mix or multiplex video streams encoded by one or more of encoder units in the encoder array 235 to obtain a video stream with a bit rate suitable for transmission to the destination endpoint devices, as determined by the bit rate management and control unit 215 (e.g., based on network congestion levels). For example, encoder units in the encoder array 235 may generate a first and second video stream at different respective first and second bit rates, and the bit rate multiplexer 220 may multiplex or mix components of the first and second video streams to generate a third video stream at a third bit rate as describe further hereinafter.

The decoder array 230 is coupled to the endpoint network interface unit 205 and the processor 225. The decoder array 230 comprises a plurality of decoder units 230(1)-230(p) and is configured to receive an encoded video stream from the endpoint network interface unit 205 (originating from the source endpoint device 110(1)) and decode the encoded video stream via one or more of the decoder units. For example, the decoder array 230 may comprise one decoder unit for each endpoint device or cluster of endpoint devices in the audio/video network 100. In another example, the decoder array 230 may comprise two universal decoders, one of which decodes a video stream received from a current speaker (e.g., a source video stream from the endpoint device that is sending a video stream) and the other of which decodes a video stream from a previous speaker (e.g., a previous video stream the endpoint device that has sent a video stream immediately prior to the endpoint device of the current speaker). In this example, the decoder units are "pooled" into universal decoders to efficiently maximize the processing capabilities of the video conference bridge 120. In one example, the decoder units may be "pooled" into these universal decoders (e.g., such that the decoder array 230 comprises two universal decoders) based on the number of endpoint devices in the audio/video network 100. In other words, if the number of endpoint devices in the audio/video network 100 exceeds a preset threshold number of endpoint devices, the decoder units of the decoder array 230 will be "pooled" into the two universal decoders. If the number of endpoint devices in the audio/video network 100 is less than a preset threshold number of endpoint devices, the decoder units of the decoder array 230 will not be "pooled" into two universal decoders, and there may remain a one-to-one correspondence between the number of decoder units and the number of endpoint devices or the number of clusters of endpoint devices.

The encoder array 235 is coupled to the endpoint network interface unit 205, the bit rate multiplexer 220 and the processor 225. The encoder array 230 comprises an array of encoder units, shown at reference numerals 235(1)-235(q)

and is configured to encode the video streams decoded by the decoder array 230 into multiple video streams having different bit rates. For example, a first encoder unit 235(1) is configured to encode the decoded video stream to generate a first encoded video stream having a first bit rate. A second encoder unit 235(2) is configured to encode the decoded video stream to generate a second encoded video stream that has a higher bit rate than the first encoded video stream, and so on. As stated above, the bit rate multiplexer 220 can instruct the processor 225 to multiplex or mix the first video stream and the second video stream to create a third video stream having a third bit rate based on the network information gathered by the network congestion detection unit 210.

In one example, the video stream (decoded by one or more of the decoder units 230(1)-230(p) in the decoder array 230) of a current speaker at the source endpoint device 110(1) is sent to the encoder array 235, via the processor 225, to generate multiple real time adaptive bit rate streams, one for each one of the destination endpoint devices 110(2)-110(n) and adapted to (based on) network congestion conditions. The video stream of a previous speaker, at one of the destination endpoint devices 110(2)-110(n), is also sent to the encoder array to generate an adaptive bit rate stream to be sent to the source endpoint device 110(1) and adapted to (based on) network congestion conditions. In one example, one of the encoder units 235(1)-235(q) may be specifically allocated to encode the video stream of the previous speaker such that the allocated encoder unit may generate the adaptive bit rate stream for the video stream of the previous speaker without affecting video streams of the current speaker.

The processor 225 is coupled to every component shown in FIG. 2. The processor 225 is, for example, a microprocessor or microcontroller that is configured to execute program logic instructions for carrying out various operations and tasks described herein. For example, the processor 225 executes encoder unit multiplexing and bit rate synchronizing process logic 300 stored in memory 240 in order to send encoded video streams to the endpoint devices 110(1)-110(n) at appropriate bit rates based on network congestion conditions. The memory 240 may be a memory device such as read only memory (ROM), random access memory (RAM), magnetic storage media, optical storage media, flash memory, electrical, or other physical/tangible (non-transitory) memory.

The functions of processor 225 may be implemented by logic encoded in one or more tangible computer readable media (e.g., embedded logic such as an application specific integrated circuit, digital signal processor instructions, software that is executed by a processor, etc.) wherein memory 240 stores data used for the operations described herein and stores software or processor executable instructions that are executed to carry out the operations described herein.

The encoder unit multiplexing and bit rate synchronizing process logic 300 may take any of a variety of forms, so as to be encoded in one or more tangible computer readable memory media or storage device (e.g., memory 240) for execution, such as fixed logic or programmable logic (e.g., software/computer instructions executed by a processor). In some embodiments, the processor 225 is an application specific integrated circuit (ASIC) that includes fixed digital logic, programmable logic, or a combination thereof. For example, the processor 225 may be embodied in digital logic gates in a fixed or programmable digital logic integrated circuit, where the digital logic gates are configured to perform instructions of the encoder unit multiplexing and bit rate synchronizing process logic 300. In another form, the encoder unit multiplexing and bit rate synchronizing process logic 300 may be embodied in one or more tangible computer readable storage media encoded with software comprising computer executable instructions that when executed are operable to perform the operations described herein for the process logic 300.

In general, the video conference bridge 120 is configured to monitor the network conditions (e.g., network congestion) to determine the bit rates of video streams to be sent to the endpoint devices 110(1)-110(n). As stated above, by monitoring the network conditions, the video conference bridge 120 can determine whether to increase or decrease the bit rates of video streams to be transmitted to, for example, the destination endpoint devices 110(2)-110(n) from the source endpoint device 110(1). If the video conference bridge 120 determines to decrease the bit rate of the source video stream received from the source endpoint device 110(1) to be sent to one or more of the destination endpoint devices 110(2)-110(n), a first one of the encoder units 235(1)-235(q) is instructed or controlled to send the first video stream to the destination endpoint device. Likewise, if the video conference bridge 120 determines to increase the bit rate of the source video stream, a second one of the encoder units 235(1)-235(q) is instructed or controlled to send a second video stream at a higher bit rate than the first video stream to the destination endpoint device. As stated above, the video conference bridge 120 can also mix the portions of the first video stream and the second video stream to generate and send a third video stream at a different bit rate than the first or second video streams. It should be appreciated that any number of video streams having any number of bit rates can be generated by corresponding ones of the endpoint units 235(1)-235(q). As a result, the video conference bridge 120 can generate many video streams at various bit rates by mixing these video streams.

Additionally, the encoder units 235(1)-235(q) are configured to generate synchronization frames to be inserted in the video streams that are sent to the destination endpoint devices. For example, when the first and second video streams are mixed to produce the third video stream having portions of the first video stream at the first bit rate and portions of the second video stream at the second bit rate, the synchronization frames may be needed in order to switch between different bit rate portions within the third video stream. In other words, the synchronization frames can be used to synchronize a mixed video stream from a point at which a packet of the video stream might be dropped (e.g., when there is a transition between bit rates in the video stream). In one example, the synchronization frames may be key frames for video streams, and the frequency in which they are inserted in the video streams may be limited (e.g., to once every ten seconds). The synchronization frames may be intra-coded as an I-frame in accordance with the H.263 video compression standard or instantaneous decoder refresh (IDR) frames as described in the standard coded of H.264. In another example, the synchronization frames may be intra-coded as several gradual decoder refresh (GDR) frames.

Figure 3:
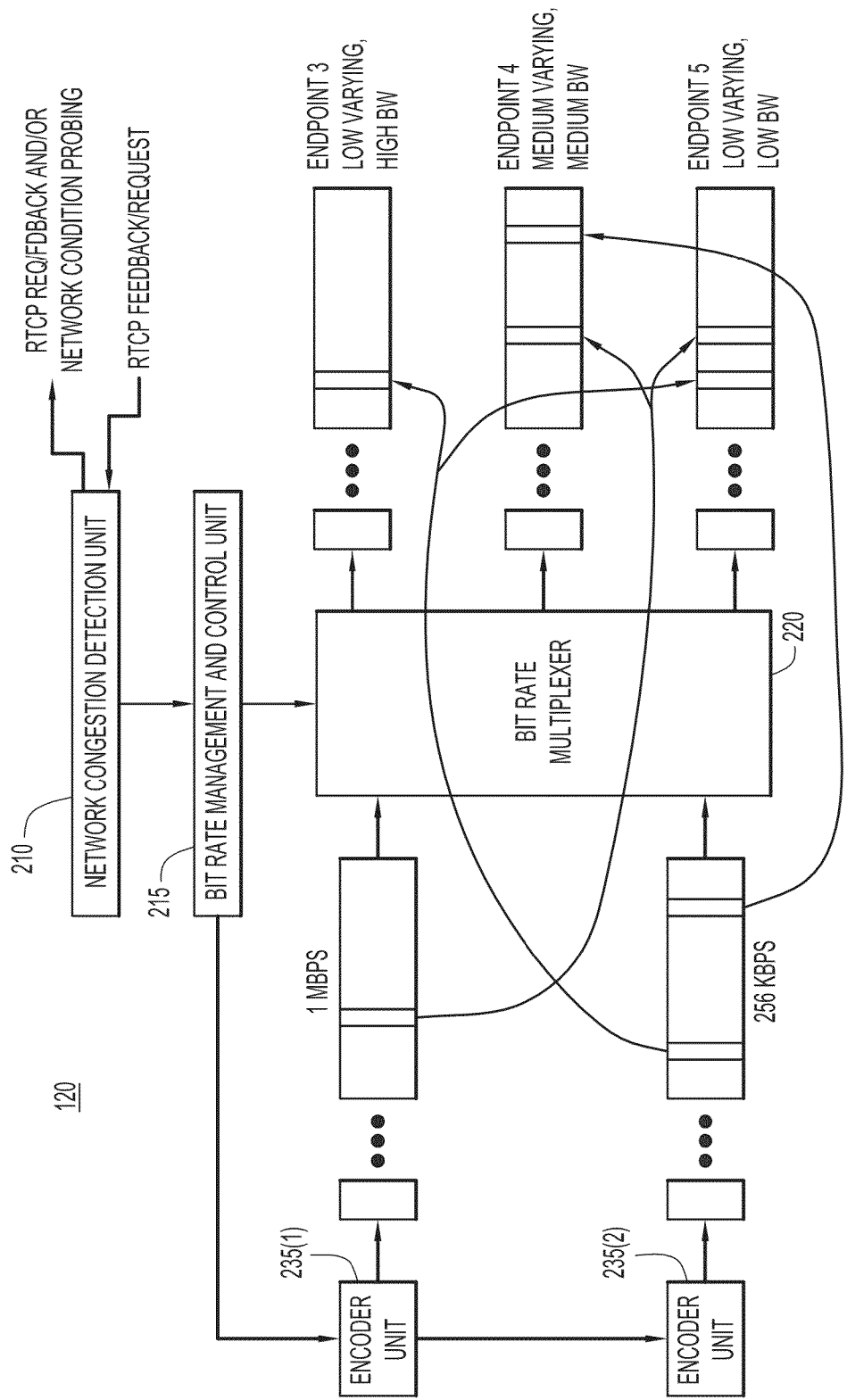
FIG. 3 is a more detailed diagram showing components of the audio/video conference bridge used to perform bit rate mixing to send encoded video streams to endpoint devices at appropriate bit rates based on network conditions.

Reference is now made to FIG. 3 which shows in more detail components of the audio/video conference bridge 120 used to perform bit rate mixing to send encoded video streams to the endpoint devices. In particular, FIG. 3 shows the network congestion detection unit 210, the bit-rate management and control unit 215, the bit rate multiplexer 220, and encoder units 235(1) and 235(2) (though, it should be appreciated that any of the encoder units 235(1)-235(q) may be represented). The network congestion detection unit 210 is configured to request and receive real time transport control protocol (RTCP) messages from the endpoint device 110(1)-110(n) over the network 130. As described above, the network congestion detection unit 210 is configured to monitor network conditions and to gather network information to determine the level of network congestion in the audio/video network 100. This information is made available to the bit rate management and control unit 215, which is configured to determine an appropriate bit rate for video streams to be transmitted to endpoint devices (e.g., destination endpoint devices 110(2)-110(n)). The bit rate management and control unit 215 forwards this information to the bit rate multiplexer 220. The first encoder unit 235(1) and the second encoder unit 235(2) also receive this information (via, e.g., processor 225).

The first encoder unit 235(1) encodes the source video stream to generate a first encoded video stream at a first bit rate. For example, FIG. 3 shows the first bit rate as one megabit per second. The second encoder unit 235(2) encodes the source video stream to generate a second encoded video stream at a second bit rate. For example, FIG. 3 shows the second bit rate as 256 kilobits per second. The bit rate multiplexer 220, having received the information from the bit rate management and control unit 215 that describes appropriate bit rates for sending the source video stream to the destination endpoint devices, mixes or multiplexes portions of the first video stream and the second video stream to produce other video streams with bit rates between 256 kilobits per second and one megabit per second. For example, the bit rate management and control unit 215 mixes the first and second video streams to produce a third video stream (having low variance and high bandwidth qualities) to be sent to endpoint device 3 (e.g., endpoint device 110(3)), a fourth video stream (having medium variance and medium bandwidth qualities) to be sent to endpoint device 4 (e.g., endpoint device 110(4)), and a fifth video stream (having low variance and low bandwidth qualities) to be sent to endpoint device N (e.g., endpoint device 110(n)). Thus, video streams can be sent to the destination endpoint devices at appropriate bit rates based on the network congestion information gathered by the video conference bridge 120. It should be appreciated that any of the endpoint devices may be used as endpoint devices 110(3), 110(4) and 110(n).

Figure 4:
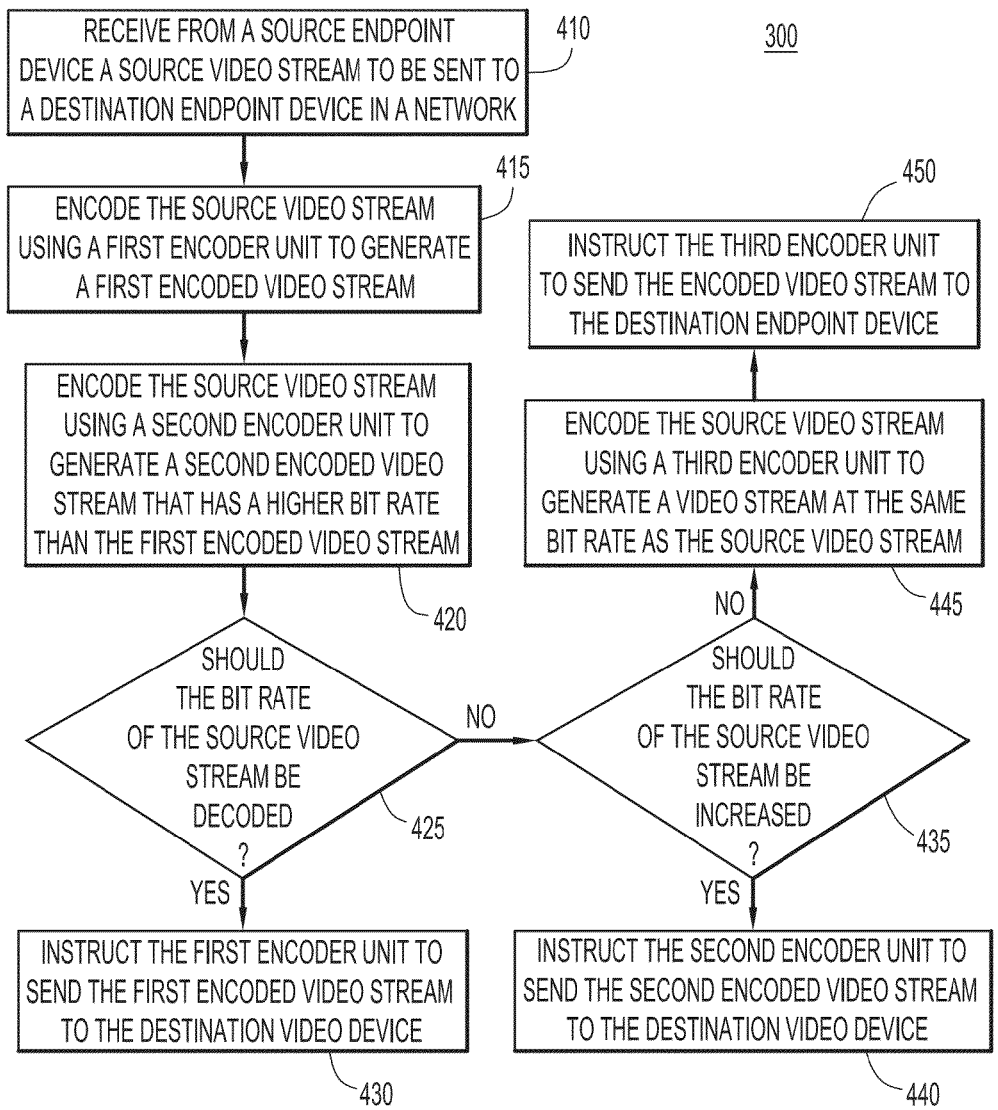
FIG. 4 is a flow chart depicting operations to encode the video streams received from a source endpoint device and to send the encoded video streams to a destination endpoint device at the appropriate bit rates.

Reference is now made to FIG. 4, which shows a flow chart depicting operations of the encoder unit multiplexing and bit rate synchronizing process logic 300 to encode the video streams received from a source endpoint device and to send the encoded video streams to destination endpoint devices at the appropriate bit rates. At operation 410, the video conference bridge 120 receives from a source endpoint device (e.g., endpoint device 110(1)) a source video stream to be sent to a destination endpoint device (e.g., one of the destination endpoint devices 110(2)-110(n)) in a network. The video conference bridge 120 then, at operation 415, encodes the source video stream using a first encoder unit to generate a first encoded video stream. At operation 420, the video conference bridge 120 encodes the source video stream using a first encoder unit (e.g., encoder unit 235(1)) to generate a first encoded video stream. At operation 420, the video conference bridge 120 encodes the source video stream using a second encoder unit (e.g., encoder unit 235(2)) to generate a second encoded video stream.

A determination is made, at operation 425, as to whether the bit rate of the source video stream should be decreased. This determination may be made based on information describing the network congestion of the audio/video network 100, as described above. If the video conference bridge 120 determines that the bit rate of the source video stream should be decreased, the video conference bridge 120, at 430, instructs the first encoder unit to send the first encoded video stream to the destination endpoint device. If the video conference bride 120 does not determine that the bit rate of the source video stream should be decreased the video conference bridge 120, then at 435, a determination is made as to whether the bit rate of the source video stream should be increased. If the bit rate of the source video stream is to be increased, the video conference bridge 120 instructs the second encoder unit, at 440, to send the second encoded video stream to the destination endpoint device. If is determined that the bit rate of the source video stream is not to be increased, the video conference bridge 120, at 445, encodes the source video stream using a third encoder unit (e.g., encoder unit 235(3)) to generate a video stream at the same bit rate as the source video stream, and at 450, instructs the third encoder unit to send the encoded video stream to the destination endpoint device.

Figure 5A:
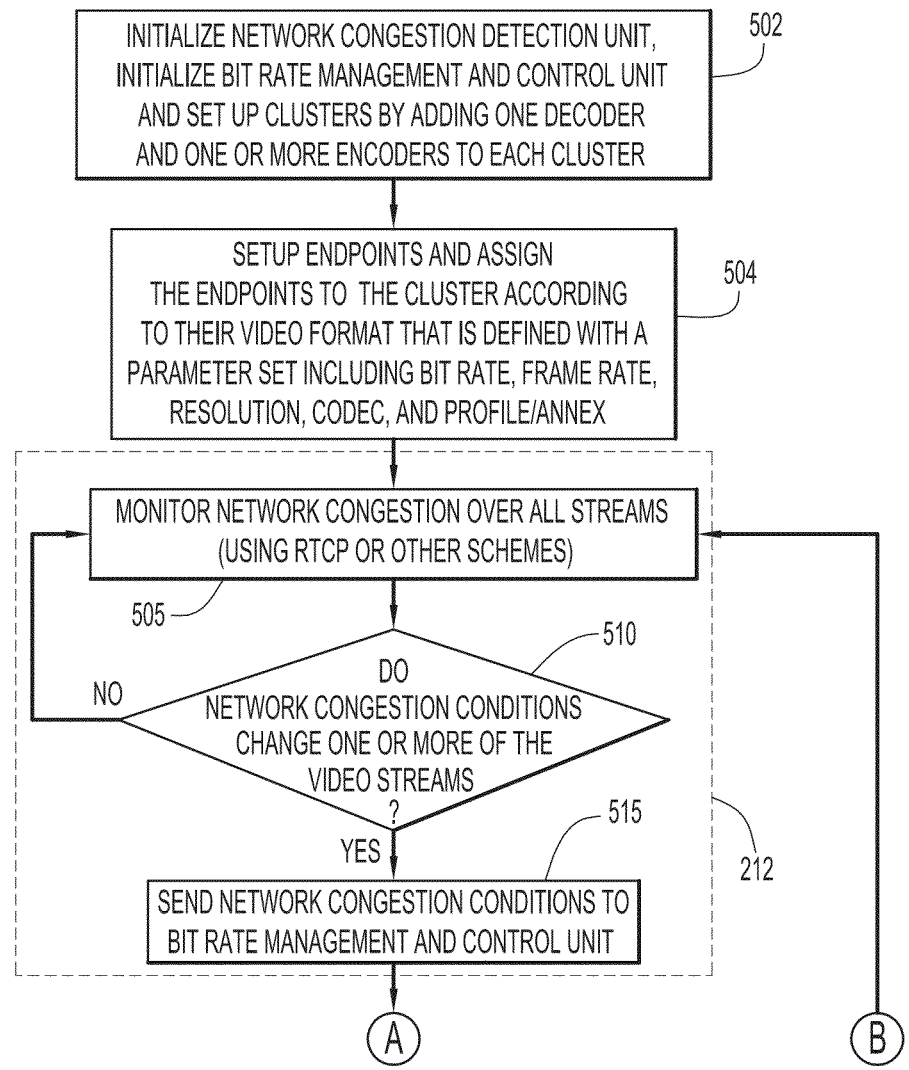
FIGS. 5A and 5B are flow charts depicting operations to determine whether to adjust the bit rate of a video stream received from one of the endpoint devices.
Figure 5B:
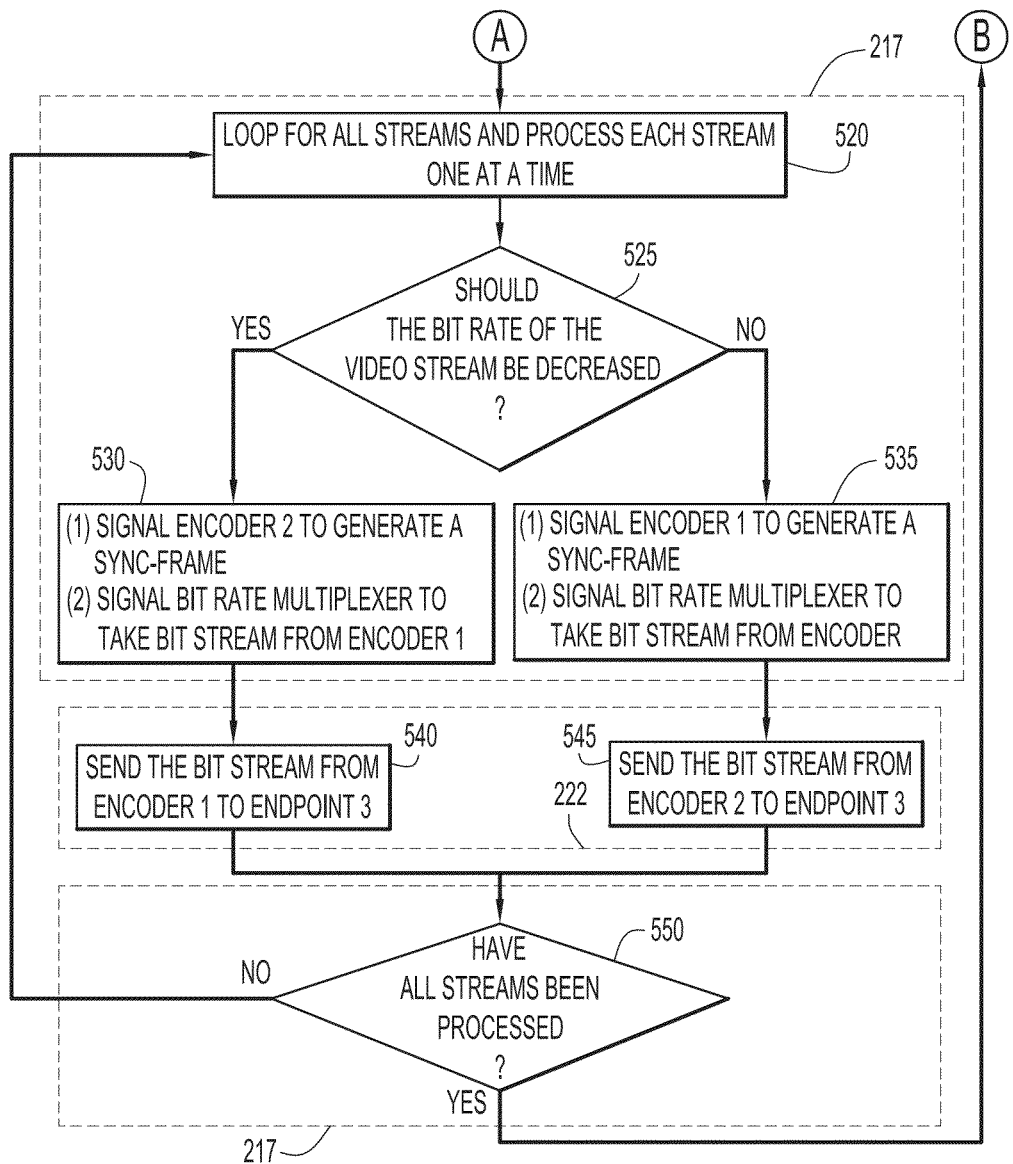

Reference is now made to FIGS. 5A and 5B. FIGS. 5A and 5B show flow charts depicting operations of the video conference bridge 120 to determine whether to adjust the bit rate of a video stream received from one of the endpoint devices. FIG. 5A shows operations performed by the processor 225 in communication and collaboration with the network congestion detection unit 210 of the video conference bridge 120. For example, the processor 225 instructs the network congestion detection unit 210 to perform the operations shown in the dotted line at reference numeral 212.

At operation 502, the processor 225 performs initialization processes to initialize the network congestion detection unit 210 and the bit rate management and control unit 215. At operation 504, the processor 225 performing conference setup operations to setup a call with the endpoint devices 110(1)-110(n) and assigns the endpoint devices to particular clusters according to their video format defined with, for example, a quintuple set of factors (e.g., bit rate, frame rate, resolution, codec and profile/annex factors). At operation 505, the network congestion and detection unit monitors the network congestion over all video streams (for example, by using RTCP or other protocols). At 510, the network congestion detection unit 210 determines whether network conditions change for the video streams (e.g., if the network conditions indicate that the bit rate for the video streams need to be increased or decreased). At 515, the network congestion detection unit 210 sends information indicating/representing the network congestion conditions to the bit rate management and control unit 215.

FIG. 5B shows operations performed by the processor in communication and collaboration with the bit rate management and control unit 215 and bit rate multiplexer 220 to perform the operations shown in the dotted line at reference numeral 217 and 222, respectively. After sending the network congestion conditions to the bit rate management and control unit 215 (operation 515 in FIG. 5A), at 520, the bit rate management and control unit 215 processes a first video stream (e.g., video stream "A") to determine, at 525, whether to decrease the bit rate for the first video stream. If the bit rate management and control unit 215 determines to decrease the first video stream bit rate, at 530, the bit rate management and control unit 215 signals a first encoder (e.g., encoder 110(1)) to generate a first synchronization frame and a video stream at a first bit rate and signals the bit rate multiplexer 220 to obtain the video stream at the first bit rate from the first encoder unit. If the bit management and control unit 215 determines not to decrease the first video stream bit rate, at 535, the bit rate management and control unit 215 signals a second encoder (e.g., encoder 110(2)) to generate a second synchronization frame and a video stream at a second bit rate higher than the first bit rate and signals the bit rate multiplexer 220 to obtain the video stream at the first bit rate from the second encoder unit.

When the bit rate multiplexer 220 receives the video stream from the first encoder unit, the bit rate multiplexer 220 sends, at 540, the bit stream from the first encoder to a destination endpoint device (e.g., destination endpoint device 110(3)). When the bit rate multiplexer 220 receives the video stream from the second encoder unit, the bit rate multiplexer 220 sends, at 545, the bit stream from the second encoder to the destination endpoint device. At 550, the bit rate management and control unit 215 determines whether all of the streams have been processed. If not, the process reverts to operation 520. If all of the streams have been processed, the process reverts to operation 505.

In summary, a method is provided comprising: at a video conference bridge, receiving from a source endpoint device in a network a source video stream to be sent to a destination endpoint device in the network; encoding the source video stream using a first encoder unit to generate a first encoded video stream; encoding the source video stream using a second encoder unit to generate a second encoded video stream that has a higher bit rate than the first encoded video stream; determining whether to decrease or increase a bit rate of the source video stream to the destination endpoint device based on network condition information; when it is determined to decrease the bit rate of the source video stream to the destination endpoint device, instructing the first encoder unit to send the first encoded video stream to the destination endpoint device; and when it is determined to increase the bit rate of the source video stream to the destination endpoint device, instructing the second encoder unit to send the second encoded video stream to the destination endpoint device.

In addition, an apparatus is provided comprising: a network interface unit configured to enable communications over a network; a first encoder unit configured to encode video data; a second encoder unit configured to encode video data; a memory; and a processor coupled to the memory and the network interface unit and configured to: receive from a source endpoint device in a network a source video stream to be sent to a destination endpoint device in the network; supply the source video stream to the first encoder unit to generate a first encoded video stream; supply the source video stream using to the second encoder unit to generate a second encoded video stream that has a higher bit rate than the first encoded video stream; determine whether to decrease or increase a bit rate of the source video stream to the destination endpoint device based on network condition information; when it is determined to decrease the bit rate of the source video stream to the destination endpoint device, instruct the first encoder unit to send the first encoded video stream to the destination endpoint device; and when it is determined to increase the bit rate of the source video stream to the first destination device, instruct the second encoder unit to send the second encoded video stream to the destination endpoint device.

Additionally, one or more computer readable storage media is provided that is encoded with software comprising computer executable instructions and when the software is executed operable to: receive from a source endpoint device in a network a source video stream to be sent to a destination endpoint device in the network; encode the source video stream to generate a first encoded video stream; encode the source video stream to generate a second encoded video stream that has a higher bit rate than the first encoded video stream; determine whether to decrease or increase a bit rate of the source video stream to the destination endpoint device based on network condition information; when it is determined to decrease the bit rate of the source video stream to the destination endpoint device, send the first encoded video stream to the destination endpoint device; and when it is determined to increase the bit rate of the source video stream to the first destination device, send the second encoded video stream to the destination endpoint device.

The above description is intended by way of example only.

The invention claimed is:

1. A method comprising:
at a video conference bridge, receiving from a source endpoint device in a network a source video stream to be sent to a destination endpoint device in the network;
encoding the source video stream using a first encoder unit to generate a first encoded video stream;
encoding the source video stream using a second encoder unit to generate a second encoded video stream that has a higher bit rate than the first encoded video stream;
determining whether to decrease or increase a bit rate of the source video stream to the destination endpoint device based on network condition information;
when it is determined to decrease the bit rate of the source video stream to the destination endpoint device, instructing the first encoder unit to send the first encoded video stream to the destination endpoint device; and
when it is determined to increase the bit rate of the source video stream to the destination endpoint device, instructing the second encoder unit to send the second encoded video stream to the destination endpoint device.

2. The method of claim 1, further comprising:
generating a first synchronization frame using the first encoder unit when it is determined to decrease the bit rate to the destination endpoint device; and
generating a second synchronization frame using the second encoder unit when it is determined to increase the bit rate to the destination endpoint device.

3. The method of claim 2, further comprising:
inserting the first synchronization frame in the first encoded video stream; and
inserting the second synchronization frame in the second encoded video stream.

4. The method of claim 3, wherein generating the first synchronization frame comprises generating a first key frame and wherein generating the second synchronization frame comprises generating a second key frame.

5. The method of claim 1, further comprising mixing the first encoded video stream and the second encoded video stream to generate a third encoded video stream.

6. The method of claim 5, further comprising instructing the first encoder unit to send the third encoded video stream when it is determined to decrease the bit rate of the source video stream to the destination endpoint device.

7. The method of claim 5, wherein mixing comprises mixing the first encoded video stream and the second encoded video stream such that the third encoded video stream includes portions of the first encoded video stream and portions of the second encoded video stream.

8. The method of claim 1, further comprising monitoring the network to obtain the network condition information indicating degree of congestion of the network.

9. The method of claim 8, wherein monitoring comprises monitoring network traffic to obtain information that indicates an amount of available bandwidth of the network.

10. The method of claim 9, wherein determining whether to decrease the bit rate to the destination endpoint device comprises determining to decrease the bit rate when the available bandwidth is less than a predetermined bandwidth threshold.

11. The method of claim 1, further comprising:
  decoding the source video stream received from the source endpoint device at a first one of pooled decoder units; and
  decoding a previous video stream received from a previous endpoint device prior to receiving the source video stream at a second one of the pooled decoder units.

12. The method of claim 1, further comprising:
  determining a number of endpoint devices in the network;
  comparing the number of endpoint devices in the network to a preset threshold number of endpoint devices; and
  when the number of endpoint devices is larger than the preset threshold of endpoint devices, decoding the source video stream received from the source endpoint device at a first one of pooled decoder units and decoding a previous video stream received from a previous endpoint device prior to receiving the source video stream at a second one of the pooled decoder units.

13. The method of claim 1, further comprising encoding the source video stream using a plurality of encoder units, the plurality of encoder units generating corresponding encoded video streams that have sequentially higher bit rates.

14. An apparatus, comprising:
  a network interface unit configured to enable communications over a network;
  a first encoder unit configured to encode video data;
  a second encoder unit configured to encode video data;
  a memory; and
  a processor coupled to the memory and the network interface unit and configured to:
    receive from a source endpoint device in a network a source video stream to be sent to a destination endpoint device in the network;
    supply the source video stream to the first encoder unit to generate a first encoded video stream;
    supply the source video stream using to the second encoder unit to generate a second encoded video stream that has a higher bit rate than the first encoded video stream;
    determine whether to decrease or increase a bit rate of the source video stream to the destination endpoint device based on network condition information;
    when it is determined to decrease the bit rate of the source video stream to the destination endpoint device, instruct the first encoder unit to send the first encoded video stream to the destination endpoint device; and
    when it is determined to increase the bit rate of the source video stream to the first destination device, instruct the second encoder unit to send the second encoded video stream to the destination endpoint device.

15. The apparatus of claim 14, wherein the processor is further configured to:
  control the first encoder unit to generate a first synchronization frame when it is determined to decrease the bit rate to the destination endpoint device; and
  control the second encoder unit to generate a second synchronization frame when it is determined to increase the bit rate to the destination endpoint device.

16. The apparatus of claim 15, wherein the processor is further configured to:
  control the first encoder unit to insert the first synchronization frame in the first encoded video stream; and
  control the second encoder unit to insert the second synchronization frame in the second encoded video stream.

17. The apparatus of claim 16, and further comprising a bit rate multiplexer unit, wherein the processor is further configured to control the bit rate multiplexer unit to mix the first encoded video stream and the second encoded video stream to generate a third encoded video stream.

18. The apparatus of claim 17, wherein the processor is further configured to control the bit rate multiplexer unit to mix the first encoded video stream and the second encoded video stream such that the third encoded video stream has portions of the first encoded video stream and portions of the second encoded video stream.

19. One or more non-transitory computer readable storage media encoded with software comprising computer executable instructions and when the software is executed operable to:
  receive from a source endpoint device in a network a source video stream to be sent to a destination endpoint device in the network;
  encode the source video stream to generate a first encoded video stream;
  encode the source video stream to generate a second encoded video stream that has a higher bit rate than the first encoded video stream;
  determine whether to decrease or increase a bit rate of the source video stream to the destination endpoint device based on network condition information;
  when it is determined to decrease the bit rate of the source video stream to the destination endpoint device, send the first encoded video stream to the destination endpoint device; and
  when it is determined to increase the bit rate of the source video stream to the first destination device, send the second encoded video stream to the destination endpoint device.

20. The computer readable storage media of claim 19, further comprising instructions operable to:
  generate a first synchronization frame when it is determined to decrease the bit rate to the first destination device; and
  generate a second synchronization frame when it is determined to increase the bit rate to the first destination device.

21. The computer readable storage media of claim 20, wherein the instructions operable to generate the first synchronization frame comprise instructions operable to generate a first key frame and wherein the instructions operable to generate the second synchronization frame comprise instructions operable to generate a second key frame.

22. The computer readable storable media of claim 19, further comprising instructions operable to mix the first encoded video stream and the second encoded video stream to generate a third encoded video stream.

23. The computer readable storage media of claim 22, further comprising instructions operable to send the third encoded video stream when it is determined to decrease the bit rate of the source video stream to the destination endpoint device.

24. The computer readable storage media of claim 22, wherein the instructions operable to mix comprise instructions operable to mix the first encoded video stream and the second encoded video stream such that the third encoded video stream has portions of the first encoded video stream and portions of the second encoded video stream.

25. The computer readable storage media of claim 19, further comprising instructions operable to monitor the network to obtain the network condition information indicating a degree of congestion of the network.

26. The computer readable storage media of claim 25, wherein the instructions operable to monitor comprise instructions operable to monitor network traffic to obtain information that indicates an amount of available bandwidth of the network.

\* \* \* \* \*